US006596416B2

(12) United States Patent
Nelson et al.

(10) Patent No.: US 6,596,416 B2
(45) Date of Patent: Jul. 22, 2003

(54) DECORATIVE LAMINATE INCORPORATING PHOTOLUMINESCENT MATERIAL

(75) Inventors: Daniel C. Nelson, Old Orchard Beach, ME (US); Robert A. Dumond, Mechanic Falls, ME (US)

(73) Assignee: Pioneer Plastics Corporation, Auburn, ME (US)

( * ) Notice: Subject to any disclaimer, the term of this patent is extended or adjusted under 35 U.S.C. 154(b) by 0 days.

(21) Appl. No.: 10/091,165

(22) Filed: Mar. 4, 2002

(65) Prior Publication Data

US 2002/0127430 A1 Sep. 12, 2002

Related U.S. Application Data

(62) Division of application No. 08/872,862, filed on Jun. 11, 1997, now Pat. No. 6,395,408.
(60) Provisional application No. 60/020,751, filed on Jun. 28, 1996.

(51) Int. Cl.$^7$ .................................................. B32B 9/00
(52) U.S. Cl. .................... 428/690; 428/195; 428/322.2; 428/534; 428/535
(58) Field of Search ............................ 428/195, 322.2, 428/526, 528, 530, 534, 535, 536, 537.1, 537.5, 542.2, 542.6, 690; 40/542

(56) References Cited

U.S. PATENT DOCUMENTS

| | | | |
|---|---|---|---|
| 2,277,169 A | 3/1942 | Switzer et al. | |
| 3,011,978 A | 12/1961 | Gosnell et al. | |
| 3,291,668 A | 12/1966 | Goldstein | |
| 3,418,189 A | 12/1968 | Grosheim | |
| 3,767,517 A | 10/1973 | Williams | |
| 4,035,652 A | 7/1977 | Schroeder | |
| 4,089,995 A | * 5/1978 | Ferro et al. .................. | 427/157 |
| 4,311,757 A | 1/1982 | Raghava et al. ............ | 428/323 |
| 4,374,886 A | 2/1983 | Raghava ..................... | 428/172 |
| 4,473,613 A | 9/1984 | Jaisle et al. .................. | 428/220 |
| 4,563,580 A | 1/1986 | Ishizuka et al. | |
| 4,623,579 A | 11/1986 | Quon .......................... | 428/215 |
| 4,627,997 A | 12/1986 | Ide .............................. | 428/216 |
| 4,652,464 A | 3/1987 | Ludlum et al. ............. | 427/157 |
| 4,741,968 A | 5/1988 | Dion et al. .................. | 428/480 |
| 4,769,265 A | 9/1988 | Coburn, Jr. .................. | 428/40 |
| 4,880,689 A | 11/1989 | Park et al. ................... | 428/143 |
| 5,073,843 A | 12/1991 | Magee | |
| 5,084,309 A | 1/1992 | Smith et al. ................. | 428/29 |
| 5,091,232 A | 2/1992 | Coburn, Jr. .................. | 428/40 |
| 5,258,235 A | 11/1993 | Mehta et al. ................ | 428/530 |
| 5,270,100 A | 12/1993 | Giglio ......................... | 428/195 |
| 5,456,949 A | 10/1995 | Albrinck et al. ............ | 427/411 |
| 5,489,241 A | 2/1996 | Perrier | |
| 5,529,541 A | 6/1996 | Perrier | |
| 5,888,142 A | 3/1999 | Perrier | |

FOREIGN PATENT DOCUMENTS

| | | |
|---|---|---|
| EP | 0 395 496 B1 | 10/1990 |
| FR | 2122566 | 9/1972 |
| JP | 04-187433 | 7/1992 |

* cited by examiner

*Primary Examiner*—Marie Yamnitzky
(74) *Attorney, Agent, or Firm*—McCormick, Paulding & Huber LLP

(57) ABSTRACT

A decorative laminate is provided which includes one or more cellulosic core sheets, one or more decor sheets and optional overlay sheets. In one embodiment, one or more of the overlay sheets and/or decor sheets are impregnated prior to lamination with a mixture of a transparent resin and a photoluminescent material. As a result, the entire upper surface of the laminate visibly luminesces in the presence of exciting radiation. In another embodiment, an image or pattern is printed on one or more of the decor sheets with a ink including an organic photoluminescent material to provide an visibly luminescent image or pattern therein. It is envisioned that the invention could be used to provide a unique and appealing appearance when used as the surfacing for a wide variety of applications, including bowling lanes, game tables, counter-tops, dance floors, and signs such as "exit" signs.

2 Claims, No Drawings

DECORATIVE LAMINATE INCORPORATING PHOTOLUMINESCENT MATERIAL

The present application is a divisional application of application No. 08/872,862, filed Jun. 11, 1997 now U.S. Pat. No. 6,395,408, which claimed the benefit of Provisional Application No. 60/020,751 filed Jun. 28, 1996. The present application claims the benefit of the above referenced applications which are both hereby incorporated by reference in their entirety.

BACKGROUND OF THE INVENTION

1. Technical Field.

This invention relates generally to decorative laminates formed of a plurality of resin impregnated cellulosic sheets. More particularly, this invention relates to high pressure decorative laminates which incorporate a material which is visibly luminescent upon exposure to ultraviolet light, and to methods of producing the same.

2. Background Information.

Conventionally, high pressure decorative laminates are made of two essential layers: a core layer and a surface layer. The core layer constitutes a bottom or supporting layer onto which the other layer is bonded. In normal high-pressure laminate manufacture, the core layer consists of a plurality of cellulosic sheets. The core sheets are generally made from a kraft paper impregnated with a laminating resin. Laminating resins commonly used for the core layer include phenolic, melamine, amino, epoxy, polyester, silicone, and diallyl phthalate resins to mane a few. The industrially preferred laminating resin for decorative laminates is the phenolic resin made from the reaction of phenols with formaldehyde.

Placed above the core layer is a decorative layer which is generally formed of one or more sheets of cellulose pigmented paper containing a print, pattern design or solid color that has been impregnated with a transparent resin, such as melamine, amino, epoxy, polyester, silicone, and diallyl phthalate resins to name a few. The preferred and typically used resin for the papers of the decorative layer is melamine-formaldehyde resin. The cured melamine-formaldehyde resins are colorless, resistant to light and heat, as well as being resistant to a variety of solvents and stains.

When the decorative layer of the laminate includes a printed pattern, it is commonly covered with what is generally referred to as an overlay, which is typically a high-quality alpha cellulose paper impregnated with a melamine-formaldehyde resin. This layer protects the decorative print from external abuse such as abrasive wear and tear, harsh chemicals, burns, spills and the like. It is primarily the melamine-formaldehyde resin which accounts for these protective properties of the laminate. The alpha-cellulose paper acts as a translucent carrier for the water-thin resin, imparts strength to the melamine-formaldehyde resin, maintains a uniform resin thickness in the overlay by acting as a shim, and controls resin flow.

The core layer, decorative layer and the overlay surface layer (when needed) are stacked in a superimposed relationship, between steel press plates and subjected to a pressure and temperature for a time sufficient to cure the laminating resins impregnating the respective layers. The elevated temperature and pressure actually cause the impregnated resins within the sheets to flow, which consolidates the whole into an internal mass known as the laminate. These laminates are used as surfacings for floors, counter tops, table tops, furniture, store fixtures, and the like. Examples of conventional high pressure decorative laminates are given, for example, in U.S. Pat. No. 3,418,189 to Grosheim et al., U.S. Pat. No. 4,311,748 to Casey et al., U.S. Pat. No. 4,473,613 to Jaisle et al., and U.S. Pat. No. 4,741,968 to Dion et al., each of which is incorporated herein by reference.

DISCLOSURE OF THE INVENTION

In accordance with the invention, a decorative laminate is provided which is comprised of a core layer, a decorative layer and an optional surface layer or overlay which are stacked and laminated under heat and pressure. The core layer includes one or more melamine or phenolic resin impregnated sheets of kraft paper or the like; the decorative layer includes one or more melamine impregnated printed sheets; and the optional overlay includes one or more thin protective melamine impregnated paper layers. In one embodiment of the invention, an image or pattern is printed on one or more of the decorative paper layers with a ink including a photoluminescent material to provide an image or pattern therein which is visible when exposed to a source of ultraviolet light (i.e., a source of electromagnetic radiation in the range of about 200–400 nm). The term "photoluminescent" is used herein to denote a material which is either visibly phosphorescent (i.e., where there is a continued luminescent radiation after termination of the exciting radiation) or visibly fluorescent (i.e., where the luminescent radiation ceases as soon as the exciting radiation is removed). The decorative paper layers are then each saturated with a clear resin, such as melamine-formaldehyde, and stacked with a core layer and, optionally, the overlay, and laminated under heat and pressure.

In a further embodiment, the photoluminescent material is visibly phosphorescent after exposure to exciting radiation in the visible range.

In another embodiment, one or more of the overlay papers and/or decorative layer papers are impregnated prior to lamination with a mixture of a transparent resin, preferably melamine, and a photoluminescent material. As a result, the entire upper surface of the laminate visibly luminesces in the presence of ultraviolet light.

In a still further embodiment of the invention, one or more of the decorative layer papers is saturated with a mixture of resin and a photoluminescent material, or is provided with a design or pattern printed with an ink including a photoluminescent material, and is then low pressure laminated or thermofused to a substrate such as particle board, fiber board or the like.

It is envisioned that the invention could be used to provide a unique and appealing appearance when used as the surfacing for a wide variety of applications, including bowling lanes, game tables, counter-tops, dance floors, and signs such as "exit" signs. The invention could also be used to provide selectively viewable printed information, such as manufacturer identifiers, for otherwise conventional decorative laminate applications.

DETAILED DESCRIPTION OF THE INVENTION

The invention is directed to decorative laminates which incorporate a photoluminescent material. In a first embodiment of the invention, the decorative laminate comprises a core layer, a decorative layer, and preferably an overlay. The core layer is of known construction and consists of one or more cellulosic sheets, preferably formed of a kraft paper, impregnated with a laminating resin. Any of the conventional laminating resins commonly used for the core layer, such as phenolic, melamine, amino, epoxy, polyester, silicone, and diallyl phthalate resins, to name a few, may be used. The preferred laminating resin is a phenolic resin made from the reaction of phenols with formaldehyde.

Placed above the core layer is a decorative layer which is formed of one or more cellulosic sheets, preferably sheets of alpha cellulose paper. Using a printing composition including an effective amount of a photoluminescent material, a design or pattern is applied to the surface of one or more of the cellulosic sheets forming the decorative layer. It is generally preferable to apply the design or pattern to the sheet or sheets which, in the final laminate, will be positioned furthest from the core layer to enhance the intensity of the luminescent radiation emitted from the surface of the laminate. The design or pattern is preferably applied to the outermost paper sheet or sheets. The manner in which the printing composition is applied to the sheet or sheets is not critical, and any known printing method, such as screen printing, gravure printing or the like, may be used.

The printing composition used in accordance with the invention includes a photoluminescent material dispersed in a suitable vehicle which offers the flow characteristics desired for the selected printing method. The photoluminescent material is provided in an amount which is effective to cause the printed design or pattern to be visibly luminescent in the final laminate. Many types of known ultraviolet light sensitive dyes or pigments may be used. In addition, visible light sensitive phospherscent materials may also be used. Selection of a particular dye or pigment will typically depend upon the desired color to be generated when the material luminesces, and whether phosphorescence or fluorescence is desired for a given application. In addition, the selected photoluminescent dye or pigment must be able to withstand the heat and pressure to which the layers are exposed during the subsequent lamination process. One preferred photoluminescent material is Leucophor BCR™, available from Clariant Corp. of Charlotte, N.C. Leucophor BCR™ is a stilbene material supplied as a liquid having about 49% solids and which generates a blue color upon luminescence. Stilbene materials are preferred.

The photoluminescent pigment or dye may be combined with conventional printing inks with which the selected photoluminescent pigment or dye is compatible and can be readily dispersed. For example, the photoluminescent pigment or dye may be combined with a Clear Screen Print Extender™, commercially available from Gotham Ink of Marlboro, Mass. Opaque colored pigments, such as brown or white, may optionally be included. Thus, depending upon the desired appearance of the final laminate, the printing composition may include opaque colored (non-photoluminescent) pigments or dyes so that the image or pattern is visible when under normal light conditions. However, the photoluminescent effect may be reduced by the addition of the non-photoluminescent pigments or dyes, especially darker color pigments or dyes, such as brown. Thus, the inclusion of non-photoluminescent pigments or dyes in the printing composition is generally not preferred, leaving the printing composition substantially clear under normal light conditions.

As will be appreciated by those skilled in the art, the printing composition may also include suitable amounts of other additives, such as viscosity modifiers, heat stabilizers, wetting agents, binders or the like, without departing from the scope of the invention.

In addition, it is contemplated that one or more of the decorative sheets may also be provided with a printed pattern or design with a conventional, non-photoluminescent ink composition. In this manner, the final laminate would exhibit a decorative surface with multiple patterns or designs, one set which is visible under normal light or daylight conditions, and another set which is visible in the presence of ultraviolet light.

Once the decorative sheet or sheets have been provided with the desired pattern or design, each sheet is then impregnated with a transparent resin as is conventional. Examples of transparent resins include melamine, polyester, acrylics, epoxy, amino, silicone, etc. A melamine-formaldehyde resin is preferred.

Finally, an overlay of a cellulosic paper or papers impregnated with a suitable transparent resin is generally provided. High-quality alpha cellulose paper(s) is preferred for the overlay. As with the decorative layers, melamine-formaldehyde is the preferred impregnating resin. Of course, the design or pattern of the photoluminescent printing composition could be printed on one of the sheets which may be termed one of the "overlay" papers. In this case, it is preferable that the printing be applied to the overlay paper(s) nearest the core and decorative layers.

The core layer, decorative layer and the optional overlay surface layer are stacked in a superimposed relationship between steel press plates or the like. As will be appreciated by those skilled in the art, an additional decorative layer and optional overlay may be provided on the opposite face of the core layer, resulting in a laminate in which both major surfaces are decorative. As is well known in the art, the stacked layers are subjected to a sufficient pressure and temperature, and for a time sufficiently long, to cure the laminating resins impregnating the respective layers. The laminating temperature is at least about 230° F., and is usually in the range of about 250° F. to about 300° F. The pressure is generally increased to between about 305 to 1500 psi. The elevated temperature and pressure cause the impregnated resins within each of the sheets to flow, which consolidates the whole into an integral mass known as the laminate.

When a source of ultraviolet light is provided, it penetrates the overlay and impinges upon the decorative layers. As a result, the photoluminescent material printed on the sheets comprising the decorative layers is caused to emit luminescent radiation so that the printed design or pattern is visible. Depending upon the photoluminescent material used, the amount of such material used, the intensity of the source of ultraviolet light, and the color of the background, it may be necessary to reduce the level of visible light impinging upon the laminate to enhance the visibility of the luminescent design or pattern.

In an alternate embodiment of the invention, the printing composition including an effective amount of a photoluminescent material is applied to the entire surface of one or more of the cellulosic sheets forming the decorative layer. Any conventional printing technique may be employed. In this manner, the entire treated surface of the resulting laminate may be made to emit visible luminescent radiation in the presence of ultraviolet light.

In a further embodiment of the invention, a similar result is obtained wherein a mixture of the selected transparent resin, preferably melamine-formaldehyde, and a photoluminescent material is prepared. The photoluminescent material may be any of the suitable known materials as discussed above. One or more of the overlay papers and/or the decorative layers papers is impregnated with the resulting mixture of resin and photoluminescent material in the conventional manner. The core layer, decorative layer and the optional overlay surface layer are stacked in a superimposed relationship and subjected to a pressure and temperature as with the known high pressure decorative laminates. Again, as a result, the entire upper surface of the laminate would be luminescent in the presence of ultraviolet light.

In addition, in the case where a photoluminescent material is applied to substantially the entirety of one or more of the overlay papers and/or decorative layer papers, another one or more of such papers may optionally be provided with an image, design or pattern printed with an opaque ink. The paper to which the opaque printing is applied would be positioned nearer the outer surface of the final laminate than the paper or papers to which the photoluminescent material is applied. As a result, in the presence of ultraviolet light, the entire upper surface of the laminate would be luminescent except for those portions corresponding to the image, design or pattern printed with an opaque ink, creating a "negative" image.

In still another embodiment of the invention, one or more of the overlay papers and/or the decorative layer papers are prepared as discussed above, with either printing or saturation with a photoluminescent material. The so-treated papers are then incorporated into a low pressure laminate. The papers treated with the photoluminescent material are stacked in a superimposed relationship with a rigid substrate, such a particle board, fiber board or the like. If printing is applied to one or more of the papers, an overlay is preferably included as discussed above. Each of the papers is impregnated with a resin in the same manner as for the high pressure laminates discussed above, although typically, as appreciated by those skilled in the art, a higher catalyst level is employed with a low pressure or thermofused laminate. A melamine-formaldehyde resin is preferred. All of these layers are placed in a hot press between steel press plates and subjected to a relatively low pressure and temperature for a time sufficiently long enough to cure the laminating resins impregnating the respective layers, as is conventional.

It is further contemplated that photochromic dyes could be used in place of or in conjunction with the photoluminescent materials in any of the applications discussed above. A photochromic dye is one which reflects one color in the visible spectrum when in the presence of light of a first wavelength, such as visible light, and reflects a second different color in the visible spectrum when in the presence of light of a different, second wavelength such as ultraviolet light.

The following examples are illustrative of the present invention and do not constitute any limitation with regard to the subject matter of the invention.

EXAMPLE 1

A solution was prepared using 3000.0 gms of Clear Screen Print Extender™, available from Gotham Ink of Marlboro, Mass., at 50% solids with 161.1 gms of Leucophor BCR™, available from Clariant Corp., at 49% solids. The resulting solution was Clear Screen Print Extender™ with approximately 5% Leucophor BCR based on solids. This solution was screen printed in a pattern onto multiple cellulose paper sheets previously provided with a maple grain design. These sheets where impregnated with melamine-formaldehyde resin prior to printing.

Two laminates were produced, each having the following layers stacked in a superimposed relationship as follows: one light basis weight melamine-formaldehyde impregnated overlay sheet, two high wear overlay melamine-formaldehyde impregnated sheets, one of the above mentioned screen printed melamine-formaldehyde impregnated decorative sheets, forty six phenolic impregnated kraft paper core sheets (for bulk and strength), one melamine-formaldehyde impregnated balance sheet (to help prevent warpage), two high wear overlay melamine-formaldehyde impregnated sheets, and one light basis weight melamine-formaldehyde impregnated overlay sheet. The sheets were positioned between steel press plates and subjected to about 1200 psi at a maximum temperature of about 300° F. for a total of about 35 minutes.

The patterns screen printed with the solution of Clear Screen Print Extender™ with Leucophor BCR were difficult to see under normal lighting, but exhibited excellent fluorescence when exposed to a source of ultraviolet light.

EXAMPLE 2

The following resin formulation was prepared by blending in a 5 gallon vessel:

| Component | Amount (gms) | Weight % |
| --- | --- | --- |
| Piomel 110[1] | 18359.4 | 91.80 |
| Water | 602.5 | 3.01 |
| Hypersal[2] | 26.6 | 0.13 |
| Magnesium Chloride | 12.1 | 0.06 |
| Leucophor BCR | 1000.0 | 5.00 |

[1]A melamine-formaldehyde resin available from Pioneer Plastics Corporation of Auburn, Maine.
[2]A wetting agent available from Hoeschst Celanese.

Overlay sheets (22# basis weight alpha cellulose paper) were impregnated with a mixture of the above formulation to a resin content of 69% by weight. A series of 3 laminates was prepared, each having one melamine-formaldehyde impregnated maple grain decorative sheet, ten phenolic impregnated kraft paper core sheets, one melamine-formaldehyde impregnated balance sheet, two high wear overlay melamine-formaldehyde impregnated sheets, and one light basis weight melamine-formaldehyde impregnated overlay sheet. Each of the 3 laminates was provided with a different top face construction as follows:

(1) one 22# basis weight melamine-formaldehyde impregnated overlay sheet;
one overlay sheet impregnated with the above resin/fluorescent formulation;
one 22# basis weight melamine-formaldehyde impregnated overlay sheet;
(2) two 22# basis weight melamine-formaldehyde impregnated overlay sheets;
one overlay sheet impregnated with the above resin/fluorescent formulation;
(3) one 22# basis weight melamine-formaldehyde impregnated overlay sheets;
two overlay sheet impregnated with the above resin/fluorescent formulation;

In each case, the sheets were positioned between steel press plates and subjected to about 1200 psi at a maximum temperature of about 300° F. for a total of about 35 minutes.

All three laminates exhibited visible fluorescence when exposed to a source of ultraviolet light. Under the ultraviolet light source, the laminate (3) showed the highest intensity of fluorescence.

EXAMPLE 3

Three samples were prepared as in Example 1, except that the Leucophor BCR™ was replaced with a phosphorescent metal oxide pigment Luminova G300C, commercially available from United Mineral & Chemical Corporation of Lyndhurst, N.J. The three samples were prepared using 1, 2 and 5 weight percent, respectively, of the Luminova G300C, and were laminated as in Example 1. Each of the three samples exhibited a visible phosphorescent "glow" in a darkened room after exposure to visible light.

EXAMPLE 4

A resin formulation was prepared as in Example 2, with the 0.5 weight percent of Day Glow D-282 powder used in place of the 5 weight percent Leucophor BCR™. The Day Glow D-282 is composed of organic resin particles containing dyes which are capable of fluorescing while in a solid state solution, and are commercially available from Day-Glo Color Corp. of Cleveland, Ohio. The samples were prepared as in Example 2, and the resulting laminates exhibited a high intensity of fluorescence.

In accordance with the provisions of the patent statutes, the invention has been described in what is considered to represent its preferred embodiments. However, it should be noted that the invention can be practiced otherwise than as specifically illustrated and described without departing from its spirit or scope.

What is claimed is:

1. A low pressure decorative laminate comprising:
    a substrate;
    a decorative layer including one or more cellulosic sheets impregnated with a thermosetting resin; and
    an optional overlay including one or more cellulosic sheets impregnated with a transparent thermosetting resin;
    wherein a photoluminescent material is applied to substantially the entirety of a selected one or more sheets of said decorative layer or said overlay or both thereby saturating said selected one or more sheets with said photoluminescent material.

2. The low pressure decorative laminate of claim 1, wherein said substrate is selected from the group consisting of particle board and fiber board.

* * * * *